US007205932B2

(12) United States Patent
Fiore

(10) Patent No.: US 7,205,932 B2
(45) Date of Patent: Apr. 17, 2007

(54) METHOD AND APPARATUS FOR IMPROVED DETERMINATION OF RANGE AND ANGLE OF ARRIVAL UTILIZING A TWO TONE CW RADAR

(75) Inventor: Paul D. Fiore, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 140 days.

(21) Appl. No.: 10/956,643

(22) Filed: Oct. 1, 2004

(65) Prior Publication Data

US 2007/0052580 A1   Mar. 8, 2007

(51) Int. Cl.
*G01S 13/42* (2006.01)
*G01S 13/32* (2006.01)
*G01S 13/86* (2006.01)
*G01S 13/00* (2006.01)

(52) U.S. Cl. .................... 342/133; 342/52; 342/53; 342/61; 342/67; 342/89; 342/94; 342/104; 342/105; 342/118; 342/128; 342/129; 342/146; 342/147; 342/149; 342/175; 342/195; 342/196

(58) Field of Classification Search ............ 342/61–67, 342/82–103, 118, 127–132, 145–147, 149–158, 342/175, 189–197, 104–116, 51–56, 133; 89/1.11
See application file for complete search history.

(56) References Cited

U.S. PATENT DOCUMENTS

| 2,907,999 | A | | 10/1959 | Wadley |
| 5,402,129 | A | | 3/1995 | Gelner et al. |
| 6,087,974 | A | * | 7/2000 | Yu ............................ 342/62 |
| 6,404,379 | B1 | * | 6/2002 | Yu et al. .................... 342/195 |
| 6,720,910 | B2 | * | 4/2004 | Yu ............................ 342/152 |

* cited by examiner

*Primary Examiner*—Bernarr E. Gregory
(74) *Attorney, Agent, or Firm*—Michael J. Long; Robert K. Tendler

(57) ABSTRACT

An improved system is provided for aiming a shotgun-based or other countermeasure system so as to be able to countermeasure incoming rockets or projectiles. In one embodiment a shotgun aimed and controlled by the subject system projects a pattern of pellets to intercept a rocket-propelled grenade or incoming projectile. The fire control system uses a CW two-tone monopulse radar to derive range and angle of arrival within 150 milliseconds, with range and angle of arrival measurements having approximately twice the accuracy of prior CW two-tone monopulse radars. The improvement derives from using all of the information in the returned radar beams and is the result of the recognition that one can use the Sum and Difference signals to assemble a two-by-two Rank One matrix that permits using singular value decomposition techniques to generate range and angle of arrival matrices in which all available information is used and in which noise is eliminated.

19 Claims, 7 Drawing Sheets

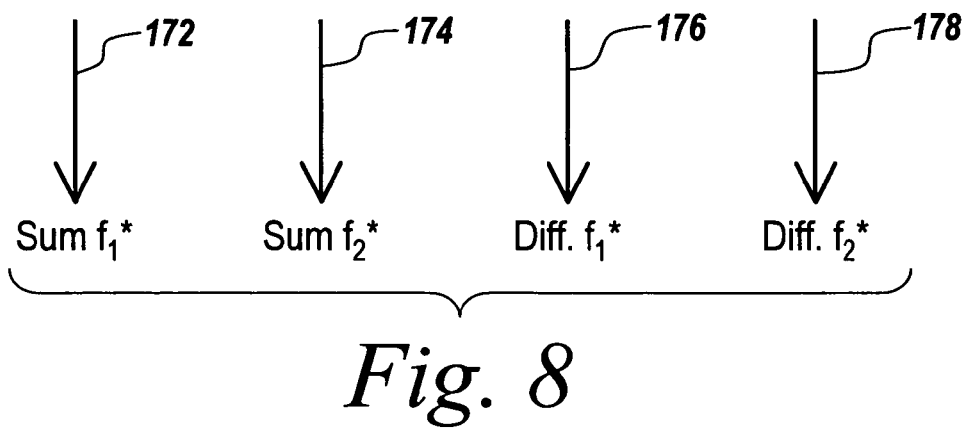
*Fig. 8*
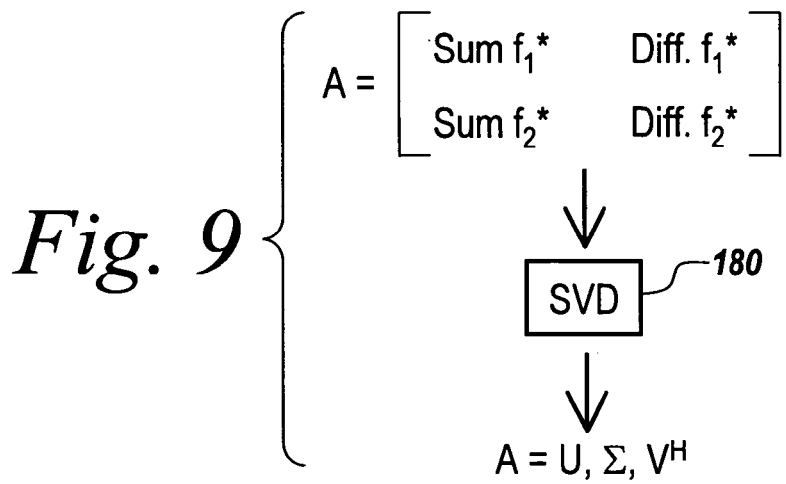
*Fig. 9*
$U = [\!\!\begin{array}{c}\phantom{x}\\\phantom{x}\end{array}\!\!:] \Rightarrow$ range  (182)
$V = [\!\!\begin{array}{c}\phantom{x}\\\phantom{x}\end{array}\!\!:] \Rightarrow$ complex mono-pulse ratio $\Rightarrow$  (184)
$\Rightarrow$ LUT $\Rightarrow$ AOA
*Fig. 10*

METHOD AND APPARATUS FOR IMPROVED DETERMINATION OF RANGE AND ANGLE OF ARRIVAL UTILIZING A TWO TONE CW RADAR

FIELD OF THE INVENTION

This invention relates to fire control systems and more particularly to a continuous wave radar for the determination of range and bearing of an incoming missile or projectile.

BACKGROUND OF THE INVENTION

Ongoing global conflicts have shown that there is a need for a low-cost solution to the problem of detecting and tracking incoming fire. Currently no system exists to provide troops with an effective automated method for detecting rocket-propelled grenades (RPGs) or other incoming fire. In some cases, for example, helicopter pilots do not even know they are being shot at, either by small arms fire or RPGs.

While passive defenses such as reactive armor or other artifices such as chicken wire have been suggested to countermeasure the RPGs, they are not effective for this purpose.

Moreover, it will be appreciated that the entire point and shoot scenario must be accomplished, for instance, within 150 milliseconds. This is because typically there are only 150 milliseconds from the time that the trigger is pulled on the RPG until impact.

Currently available warning suites tend to be too expensive to deploy on every vehicle. Consequently, only high value assets are protected by these systems. What is therefore needed is a standardized, inexpensive, active warning radar in which every vehicle could be outfitted with, at minimum, a warning device. Additionally, interfacing the radar to an appropriate countermeasure would provide for a modular and flexible outfitting methodology.

Once the range, direction and velocity of an incoming ordnance has been determined, there needs to be a suitable countermeasure that can be appropriately aimed and fired. One such system involves the use of a so-called shotgun in which a pattern of pellets is projected towards an incoming RPG. The requirements of such a system are severe in that one must be able to ascertain the trajectory or path of the incoming RPG and to be able to project out a pellet pattern that is sufficiently dense to countermeasure it. If the shotgun is mispositioned, then the pattern will miss the RPG altogether. Also important is the fact that, since the pellets disperse out in a cone, it is required that the pellets intersect the incoming RPG at an optimum range to assure optimal pellet density and cross section. If the pellet cloud intersects the incoming RPG too far away, then the pellets will have dispersed too much to guarantee an RPG kill. If the range is miscalculated such that the shotgun is fired when the RPG is too close, then the cone is so narrow that any slight aiming error will cause the narrow pellet cloud to miss the RPG.

Typical range accuracy goals for shotgun-based systems are on the order of one-half a meter, whereas typical velocity measurements require one-half meter-per-second accuracies. Moreover, angle-of-arrival accuracies need to be on the order of 0.8 degrees. Note that eight-tenths of a degree accuracy is difficult to attain.

It is thus necessary to be able to provide a system in which the angle of arrival can be accurately ascertained to within 0.8 degrees and wherein the range of the RPG can be ascertained within one-half meter.

It might be thought that one could use infrared (IR) detection techniques to detect the plume of the RPG after it is fired. However, upon reflection it will be appreciated that the bloom on the focal plane array of an IR detector is much too large to be able to provide the aiming accuracies required.

In the past, systems have been suggested to provide the angle of arrival and range measurements based on a pulse Doppler approach. However, this approach leads to a very expensive implementation. This is because the times of arrival of the pulses are used to determine range, which requires very tight timing requirements and very high throughput digital electronics. Additionally, the analog-to-digital converters required in pulse Doppler systems must operate at the pulse rate of the radar, which can be several orders of magnitude above simpler approaches. Thus, traditional pulse Doppler radars that can measure the required parameters use expensive components and require large spectral bandwidths.

Another approach to determining range and angle of arrival of an incoming ordnance involves so-called two-tone monopulse radars. As described in U.S. Pat. No. 2,907,999 issued to T. L. Wadley and U.S. Pat. No. 5,402,129 issued to Robert C. Gelner et al., two-tone monopulse CW radars have been used in the past to provide range and angle of arrival. In each of these systems, CW radar signals of two different frequencies $f_1$ and $f_2$ are detected and are separated into Sum and Difference channels. Because certain amplitude and phase relationships exist between the Sum and Difference beams of the two frequencies, range and angle of arrival can be ascertained. While these systems provide estimates of angle of arrival and range, their accuracy is too poor to support the types of aiming accuracies required to shoot down an RPG or other incoming projectile.

The reason that the prior two-tone monopulse CW radars have been unable to deliver the required accuracies derives from the fact that not all of the information that is developed in the Sum and Difference channels is used. Moreover, two-tone monopulse digital processing techniques in the past have first analyzed angle of arrival and then have used the results to determine range. The sequential processing in essence discards a fair amount of available information from the radar returns and takes up valuable time.

In one battlefield scenario, one typically uses IR detectors or bolometers, which have a 30-degree field of view that can detect the firing of an RPG through detecting the plume associated with the launching of an RPG. The purpose of using such a bolometer detector system is first and foremost to detect the launch of an RPG and secondly to be able to provide coarse coordinates for the aiming system for the shotgun. In order to provide a 360-degree ring of protection, for instance, for a HMMWV or other type of small vehicle, one would need to use multiple bolometers or cameras. These bolometers use IR focal plane arrays and take about 30 milliseconds in order to obtain the coarse angle of arrival. One therefore is left with 120 milliseconds to be able to reposition the gun and fire it. Next, one must use some type of system to refine the angle of arrival and to detect the velocity and calculate the range of the RPG.

When considering monopulse radars, the way that monopulse two-tone radars work is to provide two receive antennas, for instance, right and left for azimuth, and to form a Sum beam and a Difference beam. For elevation, two additional orthogonally oriented antennas are used. In either case the beams are added and subtracted to provide two channels. In order to obtain the angle of arrival, one divides the amplitude of the Difference beam by the amplitude of the Sum beam, with the ratio correlated to angle of arrival. However, this kind of angle of arrival measurement has a number of problems.

First, if there is more than one target in the beam, the system simply does not work. More importantly, one does not necessarily even know of the existence of multiple targets. The above monopulse radars are thus typically used in air-to-air situations where no other targets are visible.

Also, if one is off boresight more than, for instance, 4.5 degrees, one obtains erroneous answers. If the true angle is outside the plus or minus four-and-a-half degree limit, one still obtains an answer, but this answer indicates that the angle of arrival is within the four-and-a-half degrees, thus presenting an ambiguity that cannot easily be resolved.

Moreover, as mentioned above, calculating angle of arrival and calculating range has involved two separate calculations. The problem with this approach is that two separate calculations introduce calculation errors. As will be appreciated, systems that require sequential calculations have inherent accuracy limits.

Most importantly, by using prior art processing of the Sum and Difference signals from one frequency only, one throws away data that exists in the data returns which, if used, could improve the angle of arrival and range accuracies.

If one could ascertain a way to combine the range and angle of arrival measurements so as not to throw away available information, then one could obtain twice as good angle of arrival estimates and twice as good range resolution.

By way of further background with respect to two-tone monopulse radars, it is noted that, in these calculations, if one is using the Sum $f_1$ and the Sum $f_2$ in obtaining the phase Difference to estimate range, one is actually throwing away available information associated with Diff. $f_1$ and Diff. $f_1$. Moreover, if one, as in the past, were to use Sum $f_1$ and Diff. $f_1$ for establishing an amplitude ratio to determine angle of arrival, one would throw away the information available in the Sum $f_1$ and Diff. $f_1$ channels.

There is, however, a further consideration. For instance, to calculate range, if one happens to know that the target is near boresight, then using the Sum $f_1$ and the Sum $f_2$ beams, one can obtain a range estimate. However, one throws away the Diff. $f_1$ and Diff. $f_2$ information.

On the other hand, if one knows that the target is, for instance, about 4 degrees off boresight, then the Sum beams are significantly down in amplitude, for instance, 25 dB down. In this scenario, the Diff. beams are much higher in amplitude than if the target were closer to boresight. Thus, in this scenario it would be more useful to use the Diff. $f_1$ and Diff. $f_2$ beams to find the phase Differences and calculate the range and throw away the Sum $f_1$ and Sum $f_2$ beams.

In the past, there was no convenient way to be able to instantly decide whether to use the Sum $f_1$ and Sum $f_2$ beams or the Diff. $f_1$ and Diff. $f_2$ beams.

This is quite constraining and time consuming because one would have to have first calculated the angle of arrival to make the appropriate estimate. Thus, in prior art systems, in order to resolve this amplitude disparity, one had to first calculate the angle of arrival and then decide whether to keep the Sum beams and throw away the Difference beams, or to keep the Difference beams and throw away the Sum beams.

SUMMARY OF INVENTION

It is a finding of the subject invention that all of the information in the CW radar returns can be used to obtain range and angle of arrival. By doing so, one can double the accuracy of the measurement. This doubling is made possible by the recognition that the Sum $f_1$, Sum $f_2$, Diff. $f_1$ and Diff. $f_2$ beams may be assembled into a two-by-two matrix that takes into account all of the information in the Sum and Difference beams. Secondly, this two-by-two matrix has been found to have a special property, namely that it is a Rank One matrix in the absence of noise. Knowing that it is a Rank One matrix, by doing a singular value decomposition on the matrix one obtains improved noise filtering and thus increased accuracy.

In Sum, noting that Sum $f_1$, Sum $f_2$, Diff. $f_1$ and Diff. $f_2$ are complex numbers, if these complex numbers are arranged in a two-by-two matrix, and this matrix is factorized, as when utilizing singular value decomposition, then it can be shown that the resulting matrices permit calculation of range and angle of arrival with 100% greater accuracy. This is because, by assembling the Sum and Difference beams for the two frequencies in such a two-by-two matrix one can simultaneously obtain matrices having columns respectively representing range and angle of arrival that both takes full advantage of all of the data in the Sum $f_1$, Sum $f_2$, Diff. $f_1$ and Diff. $f_2$ beams, and takes advantage of the improved filtering from singular value decomposition.

Thus, by doing a singular value decomposition of the Rank One matrix, the result is that angle of arrival accuracies are improved by 100% as are the range estimates, thus to allow the successful pointing and firing of the aforementioned shotgun towards an incoming RPG or other projectile.

By using the complex numbers in the first column of the range matrix from the singular value decomposition, one can obtain the phase Difference between these complex numbers to obtain range. If one utilizes the complex numbers in the first column of the angle of arrival matrix, one can divide the absolute amplitude of the complex numbers to obtain a ratio used in a lookup table to obtain angle of arrival.

In one embodiment of the subject system, two alternating tones, $f_1$ and $f_2$, are transmitted towards an object. Two receive antennas generate Sum and Difference signals, which are down-converted, sampled, de-multiplexed and coupled to a fast Fourier transform (FFT) processor to provide Doppler frequency bins. Magnitude squaring of the data in the bins is Summed and coupled to a peak detector to ascertain by a peak which Doppler bin contains the true target. The bin that contains the true target has a Doppler shift indicative of the velocity of the incoming target, which for an RPG generally exceeds 100 meters per second.

Having ascertained the frequency bin containing the target, for this bin one then assembles the above-mentioned two-by-two matrix from the Sum and Difference beams for the two frequencies and performs a singular value decomposition to factorize this matrix into a two-by-two matrix representing range and a two-by-two matrix representing angle of arrival. A range estimate is then calculated based on the factorized two-by-two range matrix, whereas an estimate of angle of arrival is made based on the factorized two-by-two angle of arrival matrix.

What is therefore accomplished is the ability to provide fire control signals to gimbal a gun, be it a shotgun or other type of countermeasure device, onto a target that is rapidly approaching the two-tone monopulse radar. The entire start-to-finish aim and shoot interval for the subject system is less than 150 milliseconds and provides sufficient pointing accuracy to be able to direct pellets in the direction of the oncoming projectile at precisely the right time to maximize pellet pattern impact. Moreover, the pointing accuracies available with the subject system are sufficiently good so that the pellet cloud will not miss the target.

Additionally, the velocity information that is obtained as a by-product of the peak detection process is used to inhibit firing if the detected velocities are below, for instance, 100 meters per second. This means that objects such as cars, taxicabs, people and other slow-moving objects will not result in false alarms or misfirings.

In summary, an improved system is provided for aiming a shotgun-based or other countermeasure system so as to be able to countermeasure incoming rockets or projectiles. In one embodiment a shotgun aimed and controlled by the subject system projects a pattern of pellets to intercept a rocket-propelled grenade or incoming projectile. The fire control system uses a CW two-tone monopulse radar to derive range and angle of arrival within 150 milliseconds, with range and angle of arrival measurements having approximately twice the accuracy of prior CW two-tone monopulse radars.

The improvement derives from using all of the information in the returned radar beams and is the result of the recognition that one can use the Sum and Difference signals from both frequencies to assemble a two-by-two Rank One matrix that permits using singular value decomposition techniques to generate range and angle of arrival matrices in which all available information is used and in which noise is eliminated.

Thus all of the information in the Sum $f_1$, Sum $f_2$, Difference $f_1$, and Difference $f_2$ signals is used by assembling the specialized matrix, with singular value decomposition (SVD) providing cleaned-up information to provide better estimates of range and better estimates of angle of arrival. The recognition that the matrix has a very special structure enables one to both throw away noise contaminating measurements via the SVD process and use all of the information that is available from the radar returns.

In one embodiment, prior to forming the Rank One matrix, the system uses peak detection techniques to ascertain which Doppler frequency bin contains the target, with the identification of the Doppler frequency bin yielding velocity as a byproduct. Since rocket-propelled grenades travel between 120 and 300 meters per second, this velocity measurement is used to inhibit the fire control system for objects having velocities below, for instance, 100 meters per second.

BRIEF DESCRIPTION OF THE DRAWINGS

These and other features of the subject invention will be better understood in connection with a Detailed Description, in conjunction with the Drawings, of which:

FIG. 8 is a diagrammatic illustration of the $S_1$, $S_2$, $D_1$ and $D_2$ information that is used in forming the subject matrix;

FIG. 9 is a diagrammatic illustration of the formation of a two-by-two matrix using the information available in the Sum and Difference channels of FIG. 8, illustrating the singular value decomposition of the two-by-two matrix yields three different two-by-two matrices, of which the outer two-by-two matrices are used for the range and angle of arrival measurements; and, FIG. 10 is a diagrammatic illustration of the taking of the first column in the first of the matrices to obtain range, whereas taking of the first column in the second of the two matrices permits obtaining the complex monopulse ratio that is used to determine angle of arrival.

DETAILED DESCRIPTION

Figure 1:
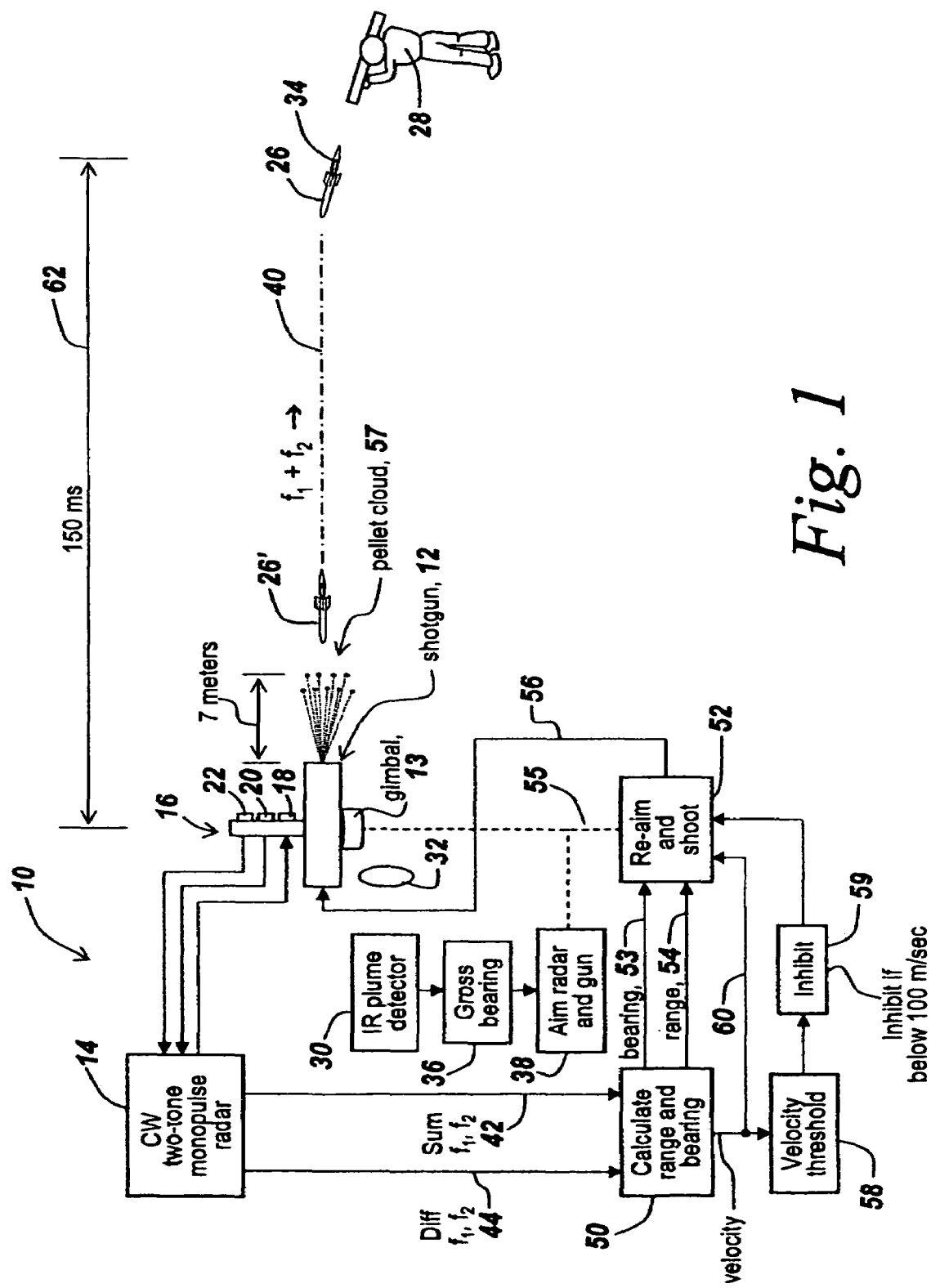
FIG. 1 is a diagrammatic illustration of a system for countermeasuring a rocket-propelled grenade using a CW two-tone monopulse radar in which gross aiming is provided through an IR detector and in which refined aiming is provided through the subject technique of taking the Sum and Difference signals from the CW radar and obtaining range and bearing by arranging the Sum and Difference data in a two-by-two matrix and performing a singular value determination on the matrix.

The theory of two-tone continuous-wave range estimation shows that target range is proportional to the difference in complex phase angle between the signal returns corresponding to the two tones. The theory of monopulse angle of arrival estimation shows that the target monopulse ratio is given by the ratio of the amplitude of the Difference to Sum channels of a given frequency. As described above, in the prior art, estimates of range and monopulse ratio are derived separately.

In the subject invention, measurements from Sum and Difference channels for two frequencies are arranged into a matrix, singular value decomposition applied, and the complex phase angles needed for target range calculation and the amplitudes and phases needed for the angle of arrival calculation are extracted from the singular vectors corresponding to the maximum singular value. This approach provides an efficient and optimal method for combining a plurality of data streams.

As mentioned above, radar designs vary widely, ranging from low-cost continuous-wave (CW) systems, to high performance, pulse-Doppler and synthetic aperture approaches. For a radar to measure range, it is typically thought that some form of amplitude or phase modulation of the carrier is required. However, there is a method using more than one CW signal that can in fact provide range. A device known as a tellurometer is available for geodetic survey work, and makes use of the fact that the survey equipment is not moving (i.e. zero Doppler shift). Radar designs for the case where there is target velocity also receive considerable attention. The utilization of multiple CW transmitted signals can produce the desired range estimates for moving targets. Additionally, approaching or receding targets can be distinguished.

Another measurement that radars are often required to make is that of the angle of arrival (AOA) of the target. Many techniques exist to perform this function, with varying cost and performance tradeoffs possible. A low-cost method known as the monopulse approach only requires two receive antennas. Sum and Difference beams are formed, and the monopulse method determines the AOA from the ratio of the magnitude of the returns from the Sum and Difference beams.

With two-tone monopulse radar, there are a plurality of data streams that can provide range and AOA measurements. In prior radar systems, the calculation of range and AOA are performed as separate functions, and any attempt to combine measurements is done in an ad hoc manner. To the contrary, the subject method combines multiple data streams in an efficient and optimal manner, using standard mathematical concepts from linear algebra. The subject invention takes advantage of the multiple data streams to provide improved performance when the data is contaminated with environmental and system noise.

Range Estimation

To simplify the description of the subject invention, first assume that the two different frequencies $f_k$, for k=1, 2 are simultaneously transmitted. Without loss of generality, it can be assumed that the transmitted signals are of the form $$s_k(t) = \cos(\omega_k t + \psi_k) \tag{1}$$

where $\psi_k$ is an unknown phase angle, and $\omega_k = 2\pi f_k$. Assume that a target has a range that varies with time as r(t)=r−vt, where r is the initial range (in meters) and v the radial velocity magnitude (in meters/sec). A positive v corresponds to a closing target. The received signals are given by $$x_k(t) = 2\alpha s_k\left(t - \frac{2r(t)}{c}\right) \tag{2}$$

$$= 2\alpha s_k\left(\left(1 + \frac{2v}{c}\right)t - \frac{2r}{c}\right)$$

$$= 2\alpha \cos\left(\omega_k\left(1 + \frac{2v}{c}\right)t - \frac{2\omega_k r}{c} + \psi_k\right),$$

where $2\alpha$ is some unknown attenuation factor, and c is the speed of light. After multiplication by the transmitted waveform and lowpass filtering, the signal becomes $$y_k(t) = \alpha\cos\left(\frac{2\omega_k v}{c}t - \frac{2\omega_k r}{c}\right); \tag{3}$$

where use has been made of the formula cos(a) cos(b)=½ cos(a−b)+½ cos(a+b). If the frequencies $f_k$ are close to each other, the periods of the waveforms will be very close. Additionally, if the motion during one Doppler period is small, the phases of waveforms will not appreciably "slip" relative to each other. Thus, a comparison between the phases of the waveforms may be made. Note that in the development above, if a had in fact been associated with a complex attenuation (i.e. a phase shift), then this error is common to both phases and is therefore cancelled out when the phase difference is calculated.

To perform the phase comparison, one measures $y_k(t)$ for a period of time and then takes the Fourier transform, often implemented as a fast Fourier transform (FFT), thereby obtaining integration gain against noise. The phase of the transform for the FFT bin corresponding to $\omega_k$ will be given by $$\phi_k = \frac{-2\omega_k r}{c} \mod 2\pi. \tag{4}$$

The difference in Fourier phase is $$\phi_2 - \phi_1 = \frac{-2(\omega_2 - \omega_1)r}{c} \mod 2\pi \tag{5}$$

$$\Delta_\phi = \frac{-4\pi\Delta_f r}{c} \mod 2\pi.$$

where $\Delta_\phi \triangleq \phi_2 - \phi_1$ and $\Delta_f \triangleq f_2 - f_1$.

To obtain an estimate for r, assuming $r < c/(2\Delta_f)$ one obtains $$0 \leq \frac{4\pi\Delta_f r}{c} < 2\pi, \tag{6}$$

and $$0 \leq |\Delta_\phi| < 2\pi. \tag{7}$$

Therefore, with the restriction $r < c/(2\Delta_f)$, the phase difference is unambiguous, and one can solve for the range via $$r_{est} = \frac{c|\Delta_\phi|}{4\pi\Delta_f}. \tag{8}$$

As described above, the target range can be estimated from either the Sum or Difference channel. Indeed, any linear combination of antenna signals may be used to form $x_k(t)$. Thus, there is a redundancy in data of which current approaches do not take advantage.

There are many methods of transmitting the two frequencies $f_k$ required for the range measurement. The frequencies can be transmitted simultaneously if the returns for each Doppler-shifted frequency can be separated by some combination of analog filtering, digital filtering, and FFT processing. Alternatively, there is a diplexing method, in which the frequencies are transmitted sequentially in a time-multiplexed fashion. In this system, the two received waveforms must be sampled synchronously to the change in transmit frequencies. Also, sufficient time must be allowed between the change in frequency and the sampling time so that the signal can propagate to the target and back.

Finally, for the present purposes it is assumed that the Doppler frequencies $2\omega_k v/c$ are small compared to the sampling rate.

AOA Estimation

With Sum and Difference channels formed, it is well known that the AOA θ is related by a known function to the monopulse ratio, ζ. That is, it is assumed that a function θ=f(ζ) is known. The relationship is generally determined through calibration experiments or can be approximated through considerations of the antenna design.

The monopulse ratio ζ is the ratio of the amplitude of the signal received by the Difference channel to that of the amplitude of the signal received by the Sum channel. Thus, for monopulse AOA estimation, the ability to measure the amplitudes of signals is required. Note that an FFT is often used to calculate the amplitudes required. The complex value of the transform for the FFT bin corresponding to $\omega_k$ gives both the magnitude and phase information.

It is noted that with two frequencies in use for measuring range, data from each frequency can be used to calculate the monopulse ratio and hence the AOA. Again there is a redundancy in data of which current approaches do not take advantage. Moreover, since Sum and Difference beams have very different beam patterns, it is desirable to perform the range estimation with a beam that has the target in the main lobe. However, this can be problematic, because the AOA would first have to be estimated in order to determine which of the Sum or Difference beam better contained the target.

With this as background, in the subject invention let $f_k$ for k=1,2 denote each of the two frequencies used. Let l=1,2 index the Sum and Difference channels (l=1 is the Sum channel, l=2 is the Difference channel).

For all channels l=1,2 and for all frequencies k=1,2 let the time domain data samples be represented by $y_{kl}(n)$, n=1, . . . ,N. The data stream for each frequency/channel combination is transformed via a conventional windowed FFT $$Y_{kl}(m) = \sum_{n=0}^{N-1} w(n) y_{kl}(n) e^{-j2\pi mn/N}, \quad (9)$$

$$k = 1, 2, \quad l = 1, 2, \quad m = 0, \ldots, N-1,$$

where w(n) is a window function. Alternatively, using well-known methods, a heavily zero-padded FFT may be used to give refined results in the processing to follow. Additionally, other well-known interpolation methods can be employed to further refine the results in the processing to follow.

Next, the magnitude squared of the FFTs are calculated and the results accumulated to obtain $$Z(m) = \sum_{k=1}^{2} \sum_{l=1}^{2} |Y_{kl}(m)|^2, \quad m = 0, \ldots, N-1. \quad (10)$$

The peak bin $\tilde{m}$ of Z, such that $Z(\tilde{m}) \geq Z(m)$ is determined via a simple peak search. As is well known, the peak search is generally performed only over frequency regions where target returns can occur as determined by system design and target dynamics. Note that it is assumed here that the Doppler frequencies, given by $2\omega_k v/c$, are all contained within a single FFT bin. This is generally true because the carrier frequencies $f_k$ are usually many orders of magnitude greater than the sampling rate in radar systems.

Optionally, a refined peak may be calculated and used in the processing to follow. There are many well known methods to calculate refined peaks, such as a parabolic interpolation approach, with the peak frequency bin being referred to as bin $\tilde{m}$, where $\tilde{m}$ is understood to possibly contain a fraction part.

Once the peak search is performed, bin $\tilde{m}$ of each of the original FFTs, FFTs, $Y_{kl}(\tilde{m})$, are arranged into a 2×2 matrix A, such that the (k, l)$^{th}$ element is given by $$[A]_{kl} = Y_{kl}(\tilde{m}) \quad (11).$$

Note that the elements of A are generally complex.

The critical observation that leads to the subject invention is that, in the absence of noise, the matrix A has a rank equal to one. This is because it was recognized that $$Y_{kl}(\tilde{m}) = \alpha a_l(\theta) \exp(-j2\omega_k r/c),$$

where θ is the AOA of the target, $a_l(\theta)$ is the beam pattern of channel l in the direction θ, and α is an arbitrary complex gain, and thus A had the characteristic of being "separable."

Specifically, as is shown in Equation 12 hereinafter, the above expression for A can be factored into separate expressions $g_r$ and $h_\theta$, hence separability. If the matrix is separable as an outer product of two vectors, then the matrix is a Rank One matrix.

$$A = \alpha \begin{bmatrix} Y_{11}(\tilde{m}) & Y_{12}(\tilde{m}) \\ Y_{21}(\tilde{m}) & Y_{22}(\tilde{m}) \end{bmatrix} = \alpha g_r h_\theta^H \quad (12)$$

$$g_r \triangleq \begin{bmatrix} e^{-j2\omega_1 r/c} \\ e^{-j2\omega_2 r/c} \end{bmatrix} \quad (13)$$

$$h_\theta \triangleq [\, a_1(\theta) \quad a_2(\theta) \,]^H. \quad (14)$$

As can be easily proved, in the noiseless case, A is rank-1.

The singular value decomposition (SVD) of A is calculated using well-known methods. The left and right singular vectors corresponding to the maximum singular value are denoted by u and v, respectively. From (12), it can be seen that $$u \propto g_r \quad (15)$$

and $$v \propto h_\theta, \quad (16)$$

where "∝" stands for stands for "is proportional to". In what follows, the k$^{th}$ element of u will be denoted as $u_k$ and the l$^{th}$ element of v will be denoted as $v_1$. From u and v, the range r and AOA θ are now estimated. Since $$u_2/u_1 = e^{-j2(\omega_2-\omega_1)r/c} = e^{-j4\pi(f_2-f_1)r/c}, \quad (17)$$

the phase difference $\Delta_\phi$ is calculated as $$\Delta_\phi = \text{angle}(u_2/u_1), \quad (18)$$

and the estimated range is calculated using Equation (8). The monopulse ratio ζ is calculated using $$\zeta = |v_2/v_1|, \quad (19)$$

and the known relationship θ=f(ζ) is used to determine θ.

How the above applies to the subject invention is now described.

Referring now to FIG. 1, a fire control system 10 for the aiming and firing of a shotgun 12 gimbaled by a gimbal 13 includes a CW two-tone monopulse radar 14 coupled to a planar antenna 16 that has a transmit element 18 co-located with receive elements 20 and 22. The CW two-tone monopulse radar is used to alternately transmit tones $f_1$ and $f_2$ in a time-multiplexed mode via transmit antenna element 18 in a pattern illustrated by reference character 24 towards a rocket-propelled grenade 26 launched by an individual 28. In this case the RPG is termed the object of interest.

The fact of the launch of a rocket-propelled grenade is detected by a plume detector 30 that incorporates focusing optics 32. The detector detects the plume 34 emitted upon launching of the rocket-propelled grenade. In one embodiment, the plume detector includes an IR focal plane array, with the IR image on the array providing gross bearing measurements available at a gross bearing module 36 as output signals coupled to a gimbaled drive unit 38 that aims both the radar antennas and the shotgun along a boresight 40, which is intended to intercept RPG 26.

This two-tone signal reflects off the object of interest and is received by the Sum and Difference channels. The output of the CW two-tone monopulse radar 14 thus consists of Sum and Difference signals, here illustrated at 42 and 44, respectively defining the Sum and Difference beams derived from receive antenna elements 20 and 22.

These Sum and Difference signals are applied to a velocity, range and bearing calculator 50, the bearing 53 and range 54 outputs of which are coupled to a module 52 that develops fire control commands 55 and 56 to re-aim gun 12 and shoot pellets towards the RPG when it arrives at the position indicated by RPG 26'.

As can be seen in the bottom portion of this figure, RPG 26 encounters a pattern of shot 57, which is in the form of a pellet cloud. The pellet cloud has an optimal pattern cross-section of about one meter at approximately seven meters from gun 12. It will be appreciated that since the pellets exit the gun in a cone, at some optimal distance from the gun there will be an optimum density to provide an RPG kill.

It is noted that unit re-aim and shoot unit 52 provides a fire command signal 56 to gun 12 at exactly the precise time to provide the optimal pellet cloud pattern at seven meters, with the fire command signal being established by the velocity, range and angle of arrival of the incoming RPG at module 52.

A velocity threshold detector 58 is coupled to the velocity output 60 of the range and bearing module 50 that in one embodiment detects the Doppler frequency bin associated with the target. The Doppler frequency bin establishes the velocity of the incoming RPG. Velocity threshold detector 58 is coupled to an inhibit circuit 59, which inhibits the fire command signal 56 if the detected velocity of the incoming target is below, for instance, 100 meters per second. As mentioned hereinbefore, this velocity-related inhibit prevents false firing on slower or stationary targets. Note that the velocity output 60 is also coupled to unit 52 for the re-aiming and shooting process.

As can be seen from double-ended arrow 62, the entire cycle is less than 150 milliseconds between the time that RPG 26 is launched and the time that the pellet cloud 57 must impact the RPG, for an RPG launched from 25 meters away.

In the past, the problem with CW two-tone monopulse radars has been that neither the bearing accuracy nor the range accuracy was sufficient to be able to aim the shotgun with required accuracy or to fire the shotgun at the appropriate instant. This in general precluded the use of prior CW two-tone monopulse radars for countermeasuring not only RPGs but also small arms fire and the like.

However, with the improved processing offered by range and bearing unit 50 of the Sum and Difference signals, it can be shown that the accuracy normally associated with CW two-tone monopulse radars can be improved by 100%. Moreover, in functional tests of the subject system, an RPG was acquired by the passive IR detector in 30 milliseconds, with the remainder of the 120-millisecond timing being occupied by repositioning the gimbaled gun and firing it.

Figure 2:
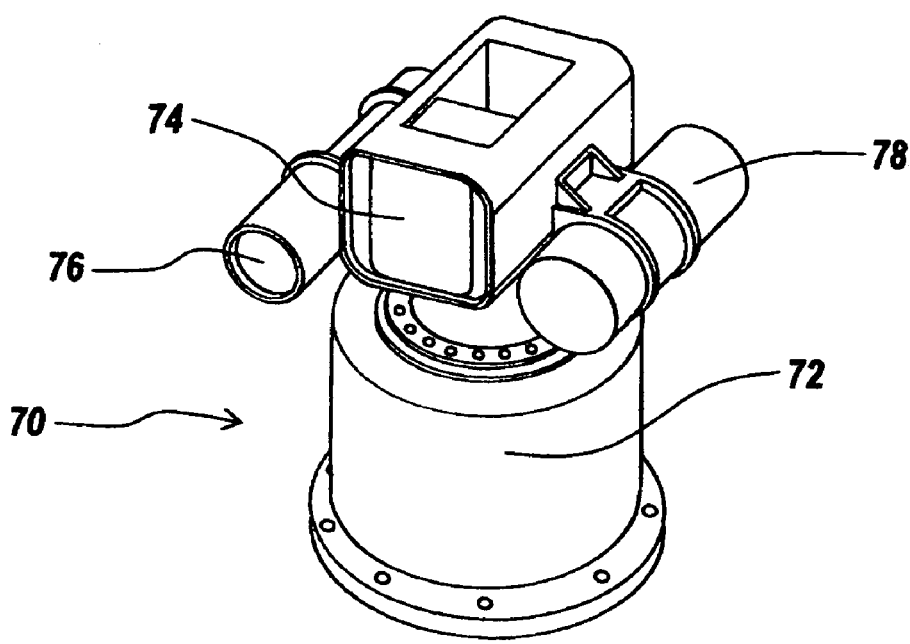
FIG. 2 is a diagrammatic illustration of a pod mountable on a vehicle in which a tracking sensor and fire control electronics are mounted on a gimbal surrounded by multigun clusters.
Figure 3:
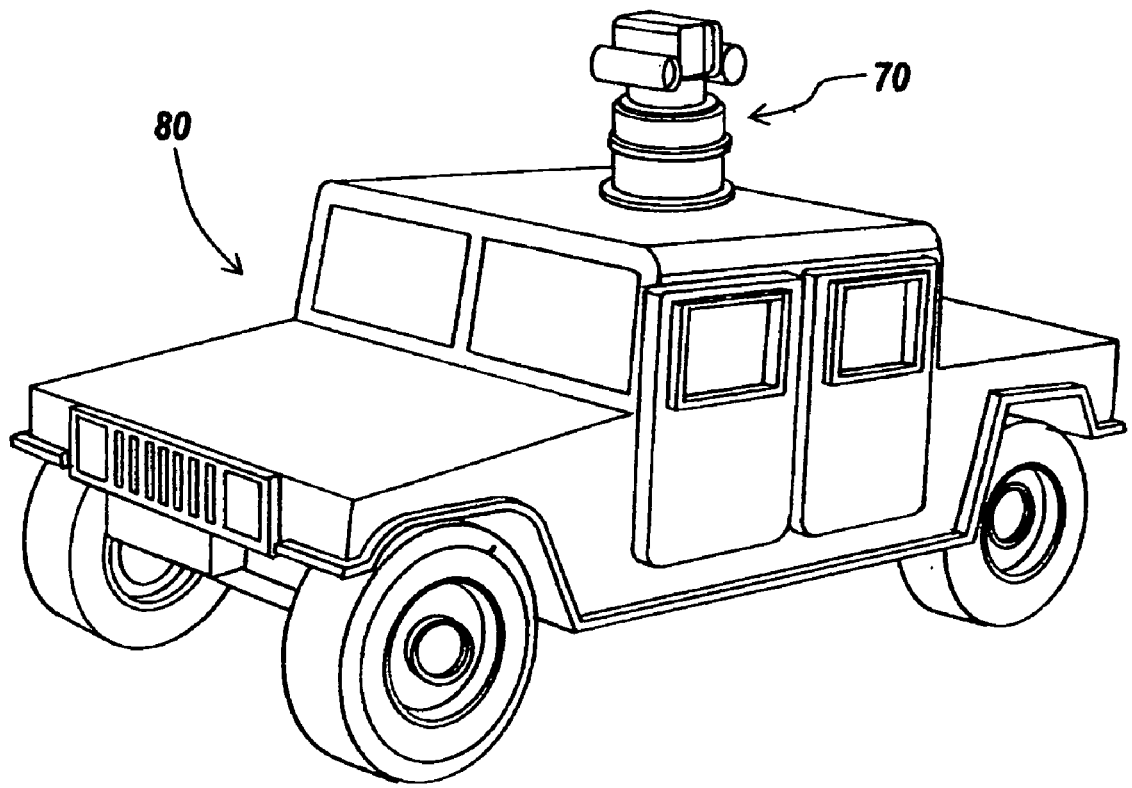
FIG. 3 is a diagrammatic illustration of the mounting of the pod of FIG. 2 on a vehicle.

As a result of making inexpensive CW radars accurate enough for close-in work, as illustrated in FIG. 2, an inexpensive module 70 can be provided with the subject fire control system. The module in one embodiment uses an azimuth motor 72 and a tracking sensor pod 74 carrying the CW two-tone monopulse radar, which is flanked with opposed multi-gun clusters 76 and 78. As illustrated in FIG. 3, the entire module 70 can be mounted atop a vehicle 80 such as a HMMWV so as to protect the occupants of the HMMWV or its general vicinity.

As will be described, the subject system may be deployed at $\frac{1}{100}^{th}$ the cost of a pulsed Doppler radar. In the subject system, not only is the critical 150 millisecond requirement met but also accuracies exceed those required by the shotgun involved in the countermeasure.

Figure 4:
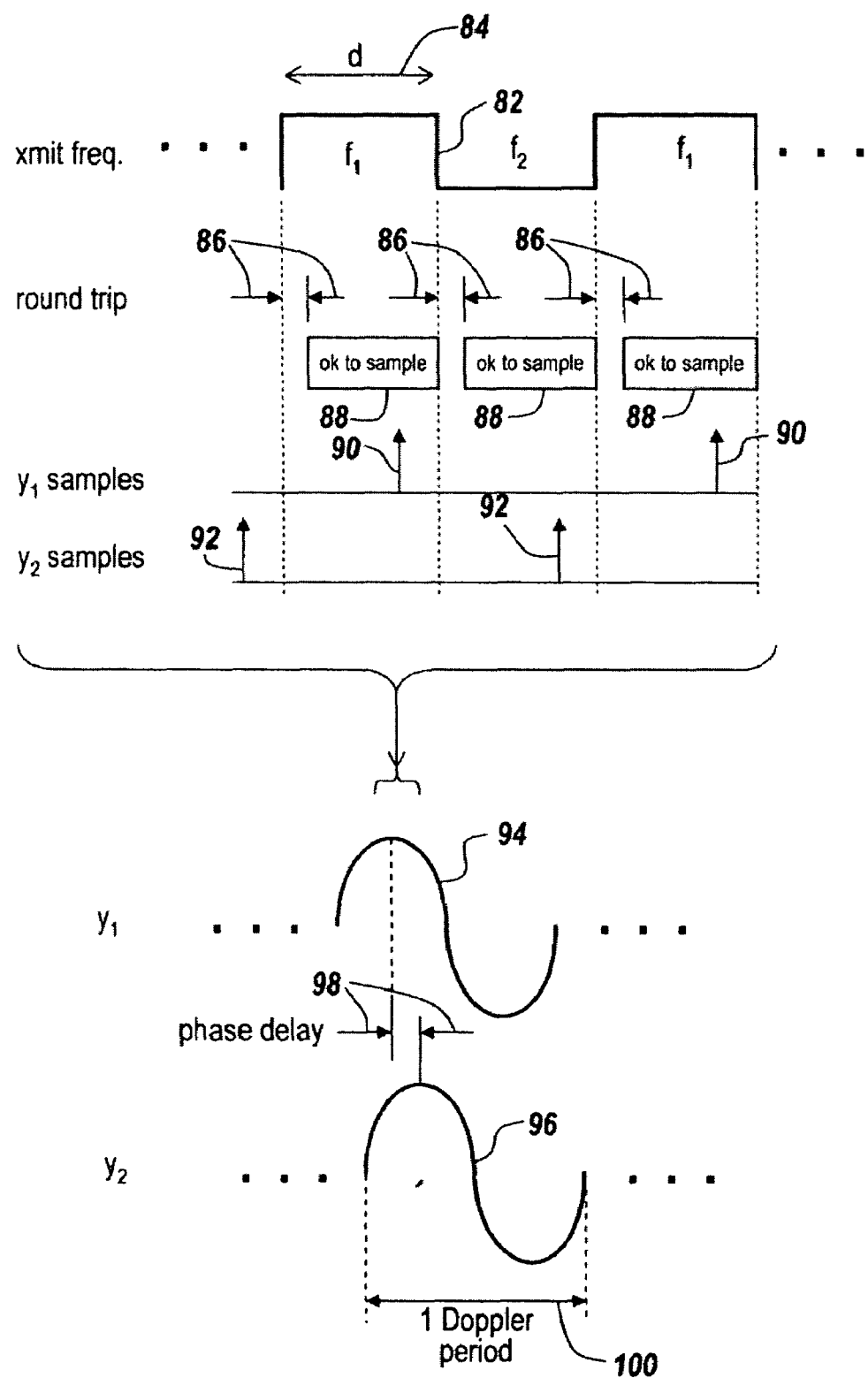
FIG. 4 is a diagrammatic illustration of the transmission of sequential tones of differing frequencies, indicating the sampling and measured phase delays for providing angle of arrival and range measurements.

Referring to FIG. 4, a diplex timing diagram is illustrated in which the two tones, frequency $f_1$ and frequency $f_2$, are interleaved as illustrated by waveform 82. The duration of the transmission of each of the tones $f_1$ and $f_2$ is indicated by double-ended arrow 84, designated d. In terms of sampling, it is noted that the round trip travel time of the signal from the transmit antenna back to the receive antenna is illustrated by arrows 86, which define a zone from which sampling is to be excluded. As illustrated by zones 88, the sampling zone in which it is permissible to sample runs from the time associated with the returned signal associated with one tone to the time associated with the generation of the next tone. Assuming that one samples $f_1$ waveform at 90 and one samples the tone $f_2$ waveform at positions 92, and further assuming that $y_1$ refers to the returned Doppler-shifted $f_1$ tone and $y_2$ refers to the returned Doppler-shifted $f_2$ tone, then as illustrated by respective waveforms 94 and 96, there will be a phase delay illustrated by arrows 98 between the two received tones. It is this phase delay, available from the Sum and Difference channels, that is measured to detect both range and angle of arrival. Note that double-ended arrow 100 defines one Doppler period for the returned signals.

Figure 5:
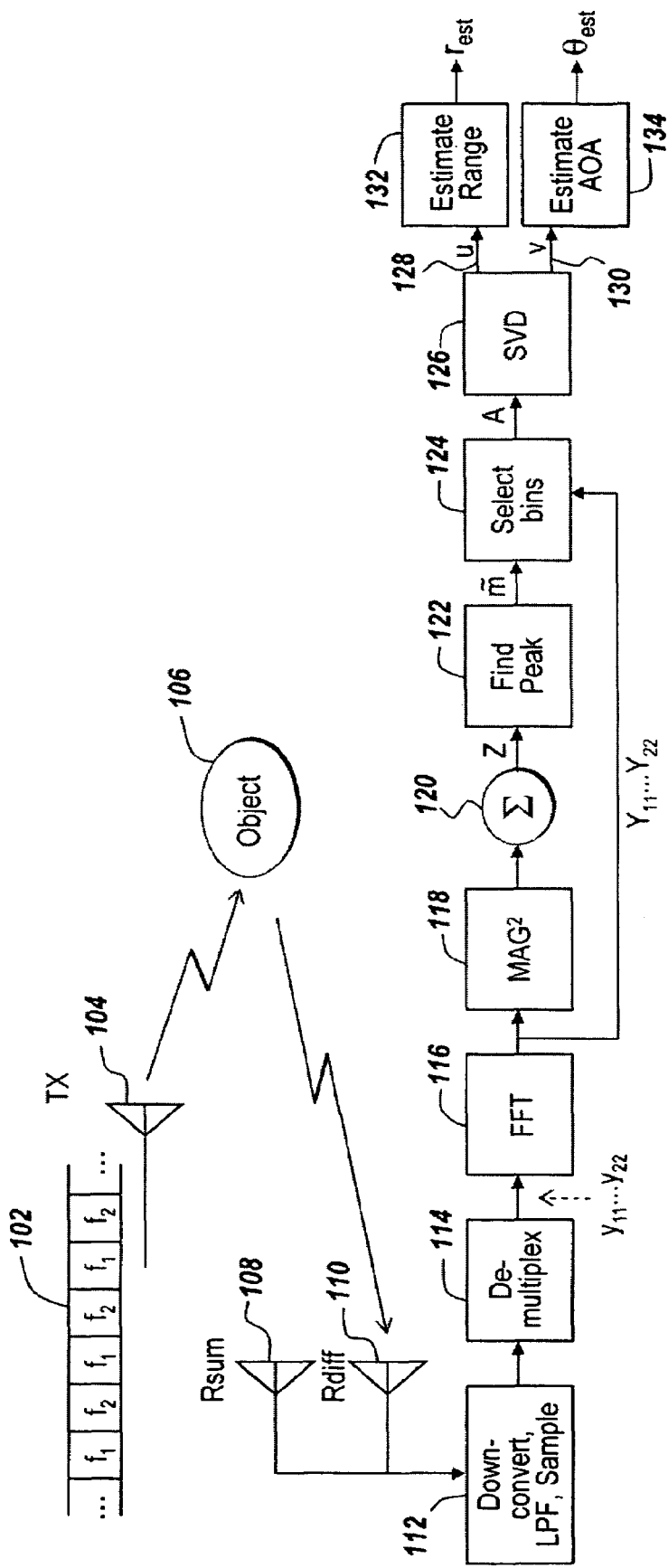
FIG. 5 is a block diagram illustrating the range and angle of arrival estimation system using the two-tone monopulse radar of FIG. 1; illustrating the development of Sum and Difference channels, the down-conversion of the Sum and Difference channels, the demultiplexing of the Sum and Difference channels followed by FFT processing and magnitude-square processing, the sum of which is used to find a peak and to select the bin in which the target resides, followed by the formation of a Rank One two-by-two matrix, the singular value decomposition of which provides two matrices from which range and angle of arrival can be estimated.

As illustrated in FIG. 5, the sequential tone generation is illustrated at 102 to include alternating $f_1$ and $f_2$ tones that are transmitted by transmit antenna 104 equivalent to transmit antenna 18 of FIG. 1. An object 106 reflects the CW transmission and returns it to the two receive antennas 108 and 110, which are equivalent to antenna elements 20 and 22 of FIG. 1. By a conventional rat ring, one can generate the Sum and Difference signals for the two frequencies, which are down-converted, low-pass filtered, and sampled by unit 112, with these signals then demultiplexed by demultiplexer 114 to provide time-domain streams $y_{11}(n), \ldots y_{22}(n)$. The output of demultiplexer 114 is essentially four channels, the first two relating to the Sum and Difference returns of the first tone and the last two relating to the Sum and Difference returns of the second tone. The output is applied to a Fast Fourier Transform module 116, which performs individual FFTs according to Equation 9 to produce frequency-domain data streams $Y_{11}(\hat{m}), \ldots Y_{22}(\hat{m})$. The magnitude-squared of the individual bins are calculated by unit 118, with the magnitude-squared of the FFT bins accumulated at 120 in accordance with Equation 10 to produce Z(m) for m=1, ... N−1 ... Z(m) is peak searched by peak detector 122, which detects which of the Doppler frequencies detected corresponds to a frequency bin having Doppler returns from the target. The peak detector thus produces the index ($\hat{m}$) for the largest peak. The index is used to retrieve the corresponding bins $Y_{11}(\hat{m}), \ldots, Y_{22}(\hat{m})$, which are then arranged into the matrix A according to Equation 11.

Note that although one knows the carrier frequency at which the transmission has occurred, one doesn't know what the Doppler frequency is. In the subsequent invention, a standard search finds the Doppler frequency of the target, at which point the Sum and Difference beams for this frequency are that which are analyzed.

Having selected which Doppler bin contains the target as illustrated at 124, a two-by-two matrix A is formed, which as mentioned hereinabove is a Rank One matrix that is applied to a singular value decomposition module 126 that factorizes matrix A and provides two-by-one matrices U and V from which columns u and v are derived. u is the first column of U and v is the first column of V, as illustrated on lines 128 and 130 respectively. u and v are applied respectively to a range estimation unit 132 and an angle of arrival estimation unit 134 which can use the methods detailed in Equations 8, 18 and 19.

Figure 6:
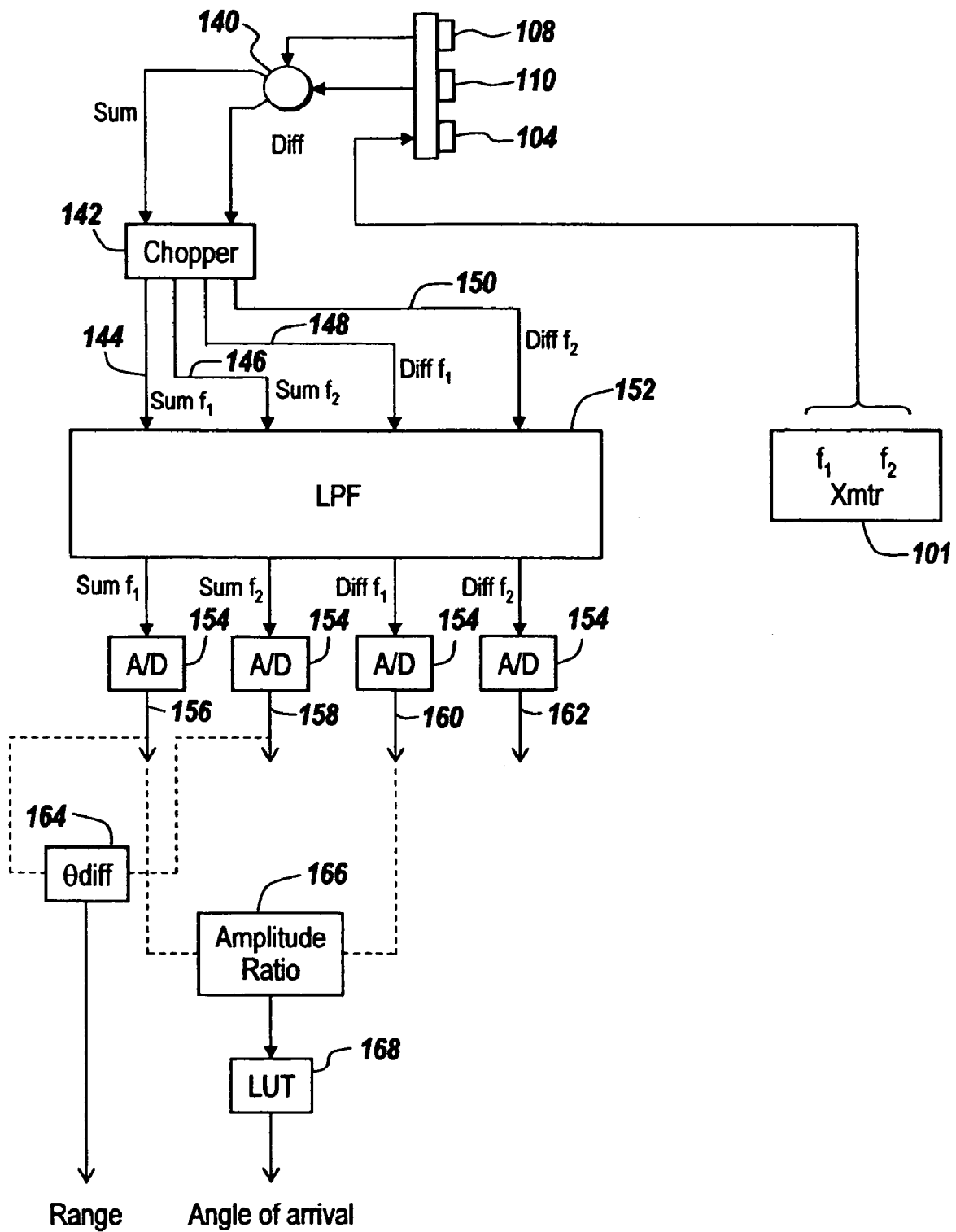
FIG. 6 is a diagrammatic illustration of how the Sum and Difference beams for the monopulse two-tone radar of FIG. 1 have been processed, indicating that for range measurements, Diff. $f_1$ and Diff. $f_2$ information is thrown out, whereas for angle of arrival measurements, Sum $f_2$ and Diff. $f_2$ information is thrown out.

Referring now to FIG. 6, how the system of FIG. 5 operates is described. Here, antennas 108 and 110 provide the Sum and Difference signals by a rat ring 140, which supplies the Sum and Difference signals to a chopper 142 used in down-convert unit 112. The result of the chopping of the Sum and Difference signals is that a Sum $f_1$ signal is outputted on line 144, a Sum $f_2$ signal is outputted on line 146, a Diff. $f_1$ signal is outputted on line 148 and a Diff. $f_2$ signal is outputted on line 150. These signals are low-pass filtered at 152 and are sampled by analog-to-digital converters 154 to output the aforementioned time-domain signals corresponding to Sum $f_1$ on line 156, Sum $f_2$ on line 158, Diff. $f_1$ on line 160 and Diff. $f_2$ on line 162.

In the past, in order to calculate angle of arrival, the phase Difference between Sum $f_1$ on line 156 and Sum $f_2$ on line 158 is derived by unit 164, with the phase Difference being convertible to range. Here it will be seen that the phase Difference does not include any information from the Diff. $f_1$ signal on line 160 or the Diff. $f_2$ signal on line 162.

Likewise in the past, in order to calculate angle of arrival, the Sum $f_1$ signal on line 156 and the Diff. $f_1$ signal on line 160 is coupled to an amplitude ratio calculation unit 166, the output of which is applied to a lookup table 168 to obtain angle of arrival. Here it will be appreciated that the Sum $f_2$ information on line 158 and the Diff. $f_2$ information on line 162 is unused. This unused information materially affects the accuracy of the range and angle of arrival, which information, if made available, could materially improve the angle of arrival and range measurements.

Figure 7:
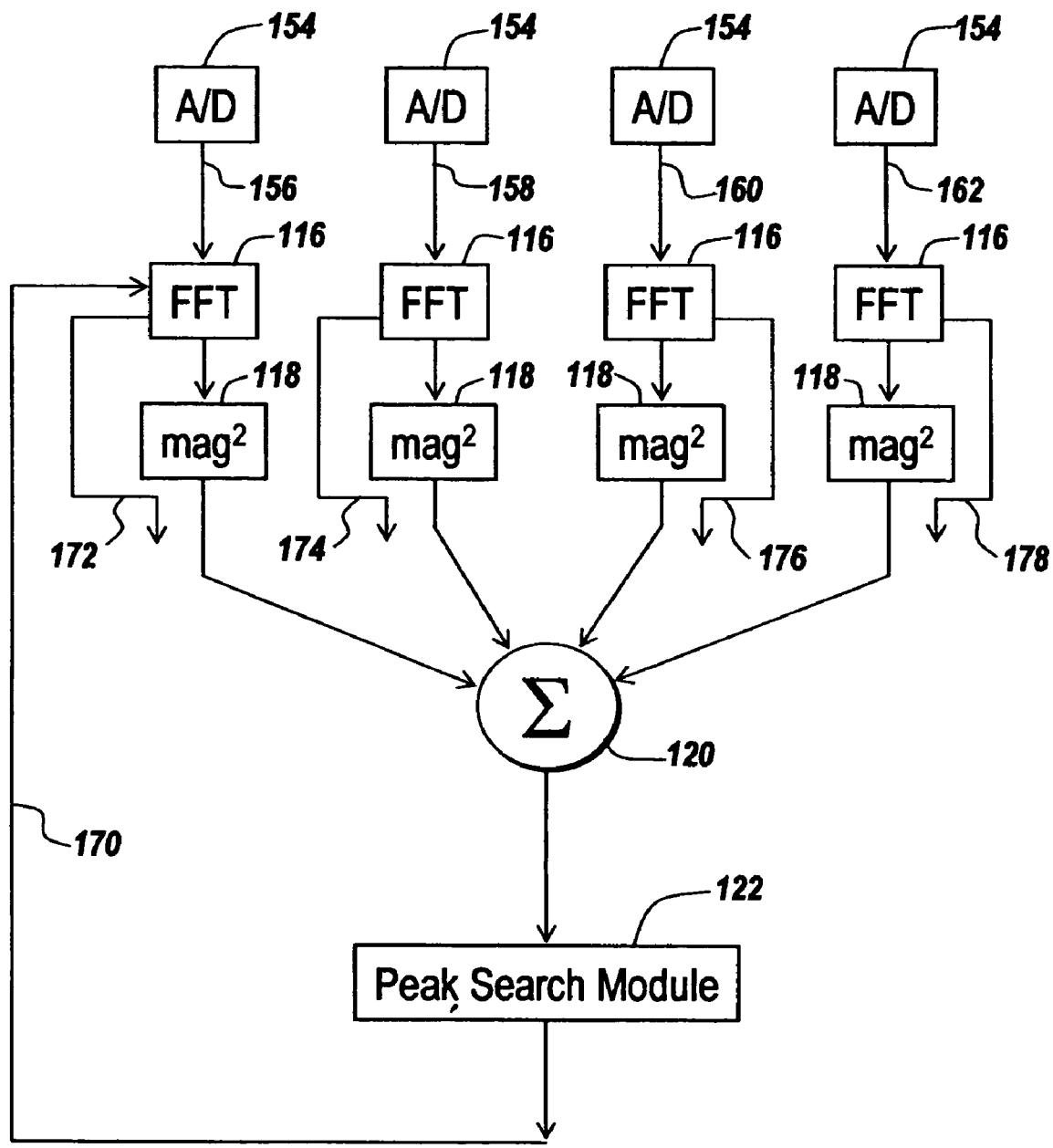
FIG. 7 is a diagrammatic illustration of the use of all of the information in the Sum and Difference channels to permit the execution of a peak search for all of the bins over the selected frequencies.

Referring now to FIG. 7, in the subject invention the signals on lines 156, 158, 160 and 162 are applied to Fast Fourier Transform module 116 to convert the time domain data streams to frequency domain bins. This permits establishing the Doppler frequencies of the signals in the Sum and Difference channels for each of the two tones. The results of the FFTs are magnitude-squared at 118 and are accumulated at 120. The accumulation is applied to a peak search module 122 that determines which bin has the largest magnitude squared value. This bin number is applied over line 170 back to the FFTs 116 to specify the Doppler bin that will be used in the follow-on range and angle of arrival calculations.

With the bin selected that contains the target, a two-by-two matrix A is formed by the signals Sum $f_1^*$, Sum $f_2^*$, Diff. $f_1^*$ and Diff. $f_2^*$ and referred to as the * respectively on lines 172, 174, 176 and 178. These lines are shown in FIG. 8 and refer to the Sum and Difference channel signals for the Doppler frequency that is most likely to represent the target.

As illustrated in FIG. 9, the values on lines 172, 174, 176 and 178 are used to form the Rank One matrix A as illustrated in FIG. 9, having the above-mentioned special property. Matrix A is factorized by a singular value decomposition process 180 such that, as illustrated, Matrix A is factored into the product of three two-by-two matrices, namely U, Σ and $V^H$. The Σ matrix is not used in the range or angle of arrival computation. However, what will be seen is that all of the information in each of the Sum and Difference channels for each of the two frequencies is used in matrix A.

Referring to FIG. 10, the values in the first column, column 182 of matrix U are used in determining range, whereas the values in the first column 184 of matrix V are used to compute the complex monopulse ratio that is converted by a lookup table to angle of arrival. We refer to the first column of U as the vector u and the first column of V as the vector v.

In operation, assuming that the gimbaling mechanism cues the gimbal to within four-and-a-half degrees of the boresight, then assuming one can find the Doppler bin where the target is and if one takes the peak Doppler bin for all channels, one can form the two-by-two Rank One matrix A. It will be appreciated that the Rank One matrix means that one can represent the Sum and Difference channels instead of by a random two-by-two matrix, by one that is the product of two vectors u and v. Within these two vectors one has vectors that yield cleaned-up information from which one can estimate the range of the target, with the other one yielding cleaned-up information from which one can estimate the angle of arrival. Since it is a known fact that matrix factorization uses data with the optimum efficiency, one can use this Rank One property to obtain the required accuracies.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for improving the range and angle of arrival accuracy of a two-tone CW radar from which sum and difference signals for the two frequencies associated with the two tones are available, comprising the steps of:
forming a first two-by-two matrix from the sum and difference signals for each of the two frequencies associated with the two tones;
factorizing the first two-by-two matrix into a second and third matrix associated respectively with range and angle of arrival; and,
determining range and angle of arrival from the respective two-by-two matrices, whereby all of the information in the sum and difference signals for the two frequencies is used in the determination of range and angle of arrival.

2. The method of claim 1, wherein the first two-by-two matrix is a Rank One matrix in the absence of noise.

3. The method of claim 1, wherein the factorizing step includes the step of performing a singular value decomposition.

4. The method of claim 1, wherein the range determining step includes the step of determining the phase between the complex numbers in the first column of the second matrix.

5. The method of claim 1, wherein the angle of arrival-determining step includes the step of deriving the amplitude ratio between the complex numbers in the first column of the third matrix.

6. The method of claim 5, wherein the angle of arrival-determining step includes coupling the amplitude ratio to a lookup table for ascertaining the angle of arrival.

7. The method of claim 1, wherein the determining step produces estimates of range and angle of arrival, with the use of all of the information in the sum and difference signals for the two frequencies improving the accuracy of the estimates.

8. A system for determining range and angle of arrival of a target moving relative to a two-tone CW radar from which sum and difference signals for the two frequencies associated with the two tones are available, comprising:
a down converter for down-converting, low pass filtering and sampling said sum and difference signals;
a demultiplexer for providing time domain data streams corresponding to the down-converted, low pass filtered and sampled sum and difference signals;
a module coupled to said demultiplexer for performing a Fast Fourier Transform on said time-domain data stream to produce associated frequency domain data streams in the form of individual frequency bins;
a calculator for squaring the magnitude of the individual bins to produce magnitude-squared values;
an accumulator for accumulating said magnitude-squared values;
a peak search detector for determining from the accumulated magnitude-squared values which of said frequency bins has the highest peak, thus to determine which of said frequency bins contains said target;
a processor for generating a first two-by-two matrix from the sum and difference values associated with the bin that is determined to contain said target; and,
a unit for performing a singular value decomposition of said first two-by-two matrix so as to factor said first matrix into a second and third matrix respectively related to range and angle of arrival.

9. The system of claim 8, and further including a phase detector for detecting the phase between the complex numbers in the first column of said second matrix, thus to derive range.

10. The system of claim 8, and further including an angle-of-arrival detector for calculating the amplitude ratio of the complex numbers in the first column of said third matrix, whereby said amplitude ratio corresponds to angle of arrival.

11. Apparatus for determining range and angle of arrival of a target moving relative to a two-tone CW radar from which sum and difference signals for the two frequencies associated with the two tones are available, comprising:
means for forming frequency bins for said sum and difference signals;
a peak detector for determining which of said frequency bins contains said target;
a matrix generator for generating a first two-by-two matrix from the sum and difference signals in the frequency bin containing said target; and,
a factoring unit for factoring said first matrix into second and third two-by-two matrices having respective first columns containing information related respectively to the range and angle of arrival of said target, thus to determine the range and angle of arrival of said target.

12. The apparatus of claim 11, wherein the bin having the peak value contains information relating to the Doppler frequency shift of said two frequencies by the relative velocity between said radar and said target, and further including a velocity detector coupled to the frequency bin containing said target for determining the velocity of said target.

13. In a system for countermeasuring a rocket-propelled grenade using a multiple-barrel gun that projects a pattern of shot towards an incoming rocket-propelled grenade, a method for improving the aiming and firing accuracy of the gun, comprising the steps of:
using a two-tone monopulse CW radar that develops sum and difference signals for deriving the range, angle of arrival and velocity of the rocket-propelled grenade relative to the radar; and,
aiming and firing the gun based on the angle of arrival, range and velocity measurements from the radar.

14. The method of claim 13, wherein the step of deriving the range, angle of arrival and velocity of the incoming rocket-propelled grenade includes the steps of:
forming a first two-by-two matrix from the sum and difference signals for each of the two frequencies associated with the two tones;
factorizing the first two-by-two matrix into a second and third matrix associated respectively with range and angle of arrival; and,
determining range and angle of arrival from the respective two-by-two matrices, whereby all of the information in the sum and difference signals for the two frequencies is used in the determination of range and angle of arrival.

15. The method of claim 14, wherein the first two-by-two matrix is a Rank One matrix in the absence of noise.

16. The method of claim 14, wherein the factorizing step includes the step of performing a singular value decomposition.

17. The method of claim 14, wherein the range determining step includes the step of determining the phase between the complex numbers in the first column of the second matrix.

18. The method of claim 14, wherein the angle of arrival-determining step includes the step of deriving the amplitude ratio between the complex numbers in the first column of the third matrix.

19. The method of claim 14, wherein the amplitude ratio is the complex monopulse ratio and wherein the angle of arrival-determining step includes coupling the complex monopulse ratio to a lookup table for ascertaining the angle of arrival.

* * * * *

UNITED STATES PATENT AND TRADEMARK OFFICE
CERTIFICATE OF CORRECTION

| | | |
|---|---|---|
| PATENT NO. | : 7,205,932 B2 | Page 1 of 1 |
| APPLICATION NO. | : 10/956643 | |
| DATED | : April 17, 2007 | |
| INVENTOR(S) | : Paul D. Fiore | |

It is certified that error appears in the above-identified patent and that said Letters Patent is hereby corrected as shown below:

On the title page, item (74), please delete "Michael J. Long;" and insert therefor --Daniel J. Long;--

Signed and Sealed this

Nineteenth Day of October, 2010

David J. Kappos
*Director of the United States Patent and Trademark Office*